(12) United States Patent
James

(10) Patent No.: US 11,226,007 B2
(45) Date of Patent: ***Jan. 18, 2022

(54) TOLERANCE RING

(71) Applicant: SAINT-GOBAIN PERFORMANCE PLASTICS RENCOL LIMITED, Coventry (GB)

(72) Inventor: Neil James, Chepstow (GB)

(73) Assignee: SAINT-GOBAIN PERFORMANCE PLASTICS RENCOL LIMITED, Loughborough (GB)

( * ) Notice: Subject to any disclaimer, the term of this patent is extended or adjusted under 35 U.S.C. 154(b) by 420 days.

This patent is subject to a terminal disclaimer.

(21) Appl. No.: 16/199,044

(22) Filed: Nov. 23, 2018

(65) Prior Publication Data

US 2019/0093708 A1 Mar. 28, 2019

Related U.S. Application Data

(62) Division of application No. 14/842,072, filed on Sep. 1, 2015, now Pat. No. 10,174,792.

(60) Provisional application No. 62/044,752, filed on Sep. 2, 2014.

(51) Int. Cl.
| | |
|---|---|
| *F16B 21/18* | (2006.01) |
| *F16D 1/08* | (2006.01) |
| *B21D 53/18* | (2006.01) |
| *F16D 7/02* | (2006.01) |

(52) U.S. Cl.
CPC ............... *F16D 1/08* (2013.01); *B21D 53/18* (2013.01); *F16D 1/0835* (2013.01); *F16D 7/021* (2013.01)

(58) Field of Classification Search
CPC ........ F16D 1/08; F16D 1/0835; F16D 7/0271; B21D 53/18
USPC ........... 411/516, 517; 464/41; 403/365, 367; 384/535; 16/2.5
See application file for complete search history.

(56) References Cited

U.S. PATENT DOCUMENTS

| | | | |
|---|---|---|---|
| 1,639,684 A | 8/1927 | Bott | |
| 1,987,035 A * | 1/1935 | Tideman | .............. H02G 3/0616 285/154.1 |
| 2,506,404 A | 5/1950 | Woodfield et al. | |

(Continued)

FOREIGN PATENT DOCUMENTS

| | | |
|---|---|---|
| CN | 1433509 A | 7/2003 |
| CN | 101529102 A | 9/2009 |

(Continued)

OTHER PUBLICATIONS

International Search Report and Written Opinion for PCT/EP2015/069934, dated Oct. 29, 2015, 9 pages.

*Primary Examiner* — Gary W Estremsky
(74) *Attorney, Agent, or Firm* — Abel Schillinger, LLP; Chi Suk Kim

(57) ABSTRACT

A tolerance ring including a sidewall having a first and a second opposite major surfaces spaced apart by a thickness, wherein the first major surface defines an inner diameter of the tolerance ring at a first location of the sidewall and an outer diameter of the tolerance ring at a second location of the sidewall. A method of forming a tolerance ring including providing a strip of material comprising a first, a second, a third, and a fourth edge, shaping the first edge of the strip toward the third edge, and shaping the second edge of the strip toward the fourth edge.

15 Claims, 9 Drawing Sheets

(56) References Cited

U.S. PATENT DOCUMENTS

| | | | | |
|---|---|---|---|---|
| 3,910,566 A | * | 10/1975 | Pedersen | F16B 21/078 267/167 |
| 4,429,291 A | * | 1/1984 | Tenjin | H03J 1/14 334/51 |
| 4,981,390 A | * | 1/1991 | Cramer, Jr. | F16D 1/0835 403/355 |
| 6,288,878 B1 | | 9/2001 | Misso et al. | |
| 6,444,442 B1 | | 9/2002 | Ferreira et al. | |
| 6,505,974 B2 | * | 1/2003 | Giesler | F16C 33/32 384/565 |
| 7,670,079 B2 | | 3/2010 | Snadden et al. | |
| 7,850,389 B2 | * | 12/2010 | Hanrahan | G11B 5/4813 403/372 |
| 8,684,624 B2 | | 4/2014 | Slayne | |
| 8,899,914 B2 | | 12/2014 | Ring | |
| 10,174,792 B2 | | 1/2019 | James | |
| 10,371,213 B2 | * | 8/2019 | Slayne | F16C 27/02 |
| 2008/0254901 A1 | * | 10/2008 | Feng | F16D 1/0835 464/29 |
| 2010/0021263 A1 | | 1/2010 | Holt et al. | |
| 2011/0002565 A1 | | 1/2011 | Ambroise et al. | |
| 2011/0076069 A1 | | 3/2011 | Yagawara et al. | |
| 2011/0076096 A1 | | 3/2011 | Slayne et al. | |
| 2011/0150377 A1 | | 6/2011 | Hartmann | |
| 2013/0177400 A1 | | 7/2013 | Ring | |
| 2014/0187336 A1 | | 7/2014 | Hagan | |
| 2016/0061270 A1 | | 3/2016 | James | |

FOREIGN PATENT DOCUMENTS

| | | |
|---|---|---|
| CN | 102124241 A | 7/2011 |
| CN | 102630281 A | 8/2012 |
| DE | 594484 C | 3/1934 |
| EP | 2612998 A2 | 7/2013 |
| GB | 1036181 A | 7/1966 |
| JP | S5649415 A | 5/1981 |
| JP | 2002130310 A | 5/2002 |
| JP | 2013505411 A | 2/2013 |
| JP | 2013139771 A | 7/2013 |
| KR | 20100071118 A | 6/2010 |
| KR | 20130080758 A | 7/2013 |
| WO | 2016034577 A1 | 3/2016 |

* cited by examiner

TOLERANCE RING

CROSS-REFERENCE TO RELATED APPLICATION(S)

This application is a divisional and claims priority under 35 U.S.C. § 120 to U.S. patent application Ser. No. 14/842,072 entitled "TOLERANCE RING," by Neil JAMES, filed Sep. 1, 2015, which application claims priority under 35 U.S.C. § 119(e) to U.S. Provisional Application No. 62/044,752 entitled "TOLERANCE RING," by Neil JAMES, filed Sep. 2, 2014, of which all are assigned to the current assignee hereof and incorporated herein by reference in their entireties.

FIELD OF THE DISCLOSURE

The present disclosure relates to tolerance rings, and more particularly to tolerance rings having folded portions.

RELATED ART

A tolerance ring may be disposed in a radial gap formed between an inner component, e.g., a shaft, and an outer component, e.g., a bore formed in a housing. The tolerance ring can act as a force limiter to permit torque transfer between the inner and outer components. The use of a tolerance ring can accommodate variations in the diameter of the inner and outer components while maintaining interconnection therebetween.

Typically, a tolerance ring comprises a band of resilient material, e.g. a metal such as spring steel, the ends of which are brought towards one another to form an annular ring. Although tolerance rings typically include a strip of resilient material curved to form an annular ring, a tolerance ring may also be manufactured as an annular band. Projections are usually stamped or rolled into the tolerance ring. The projections can span the radial gap between the inner and outer components and transmit forces therebetween.

There continues to exist a need for tolerance rings having improved force loading characteristics.

BRIEF DESCRIPTION OF THE DRAWINGS

Embodiments are illustrated by way of example and are not limited in the accompanying figures.

Figure 1:
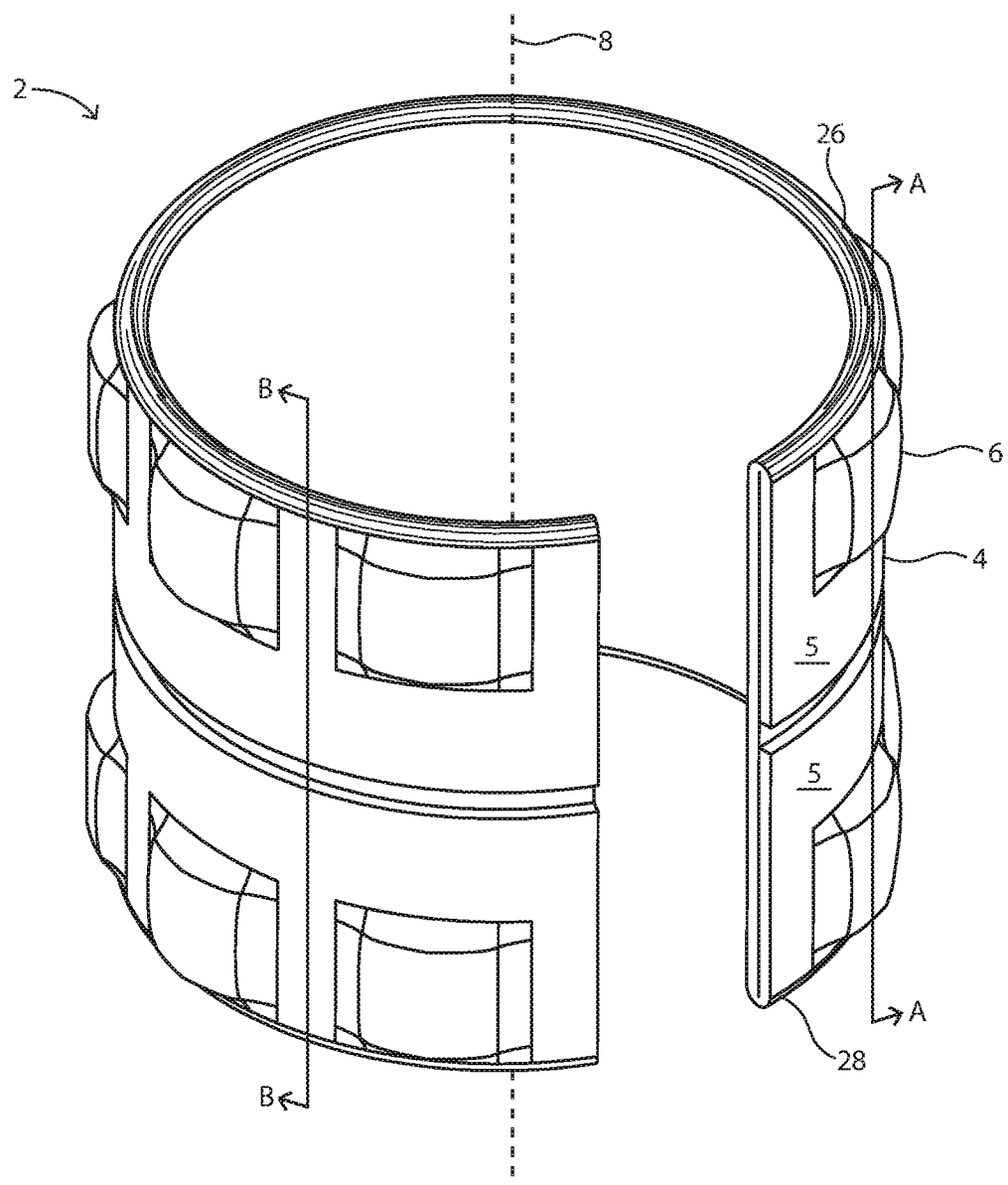
FIG. 1 includes a top perspective view of a tolerance ring in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application. Reference to ranges The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tolerance ring arts.

A tolerance ring in accordance with one or more of the embodiments described herein can generally include a sidewall having a first and a second opposite major surfaces spaced apart by a thickness. The first major surface can define an inner diameter of the tolerance ring at a first location of the sidewall and an outer diameter of the tolerance ring at a second location of the sidewall. In an embodiment, the first major surface can define a radially innermost surface of the tolerance ring at the first location of the sidewall and a radially outermost surface of the tolerance ring at a second location of the sidewall. In an embodiment, a tangent to the first major surface at the second location can be parallel to a central axis of the tolerance ring.

A tolerance ring in accordance with one or more of the embodiments described herein can generally include an axially formed multiple-wall construction along at least 25% of an axial length of the tolerance ring.

Referring now to FIG. 1, a tolerance ring 2 can generally include a sidewall 4 defining one or more folded portions 5. The sidewall 4 can be generally annular, e.g., a ring, having a central axis 8. In an embodiment, the folded portion(s) 5 can be formed by shaping a portion of the sidewall 4. In a further embodiment, the folded portion(s) 5 can be at least partially formed by shaping portions of the sidewall 4. More particularly, as described in greater detail below, the folded portion(s) 5 can be at least partially formed by folding an axial end of the sidewall 4 toward an opposite axial end of the sidewall 4.

Figure 2A:
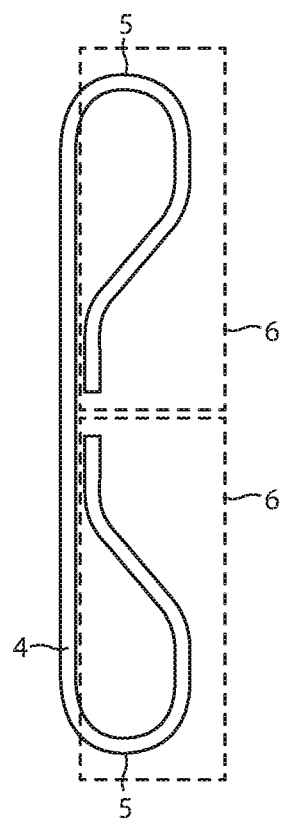
FIGS. 2A to 2E includes cross-sectional side elevation views of alternate embodiments of a tolerance ring, as seen along Line A-A in FIG. 1.
Figure 11:
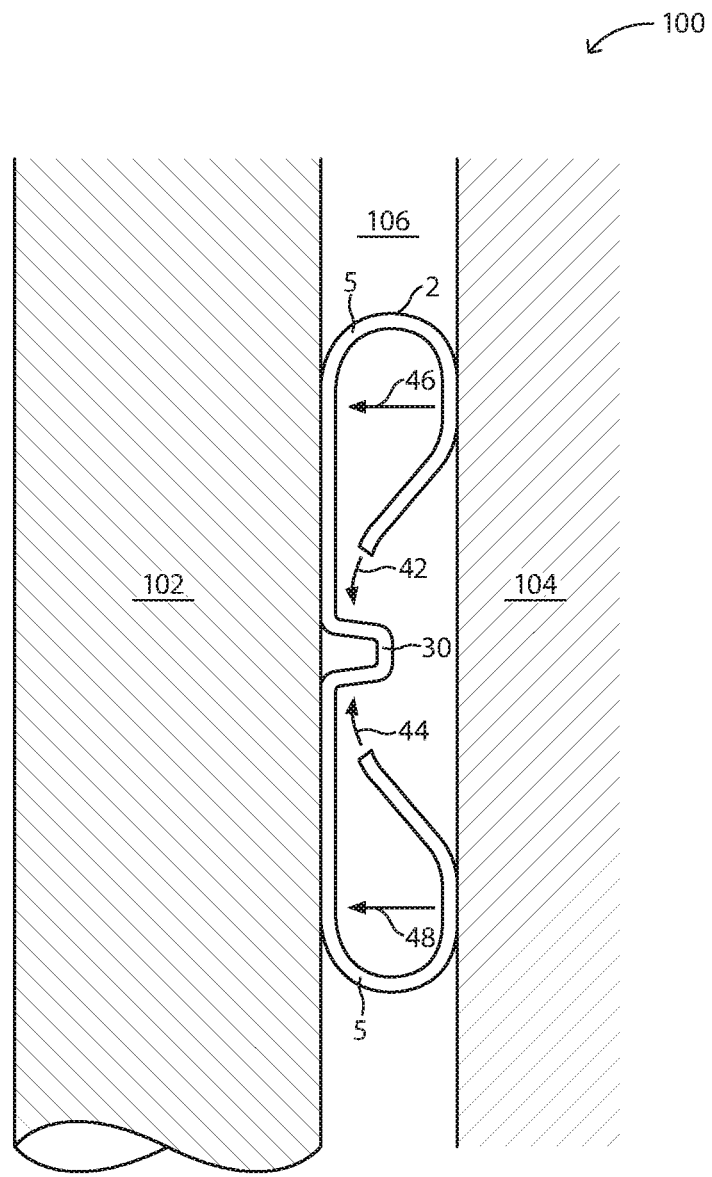
FIG. 11 includes a cross-sectional side elevation view of an assembly including an inner component, and outer component, and a tolerance ring in accordance with an embodiment.

In an embodiment, such as illustrated in FIG. 2A, at least one of the folded portions 5 of the sidewall 4 can define at least one compression feature 6 having a spring effect, i.e., the folded portion 5 can allow for absorption of a tolerance or misalignment between inner and outer components, e.g., between a shaft and a bore (FIG. 11). In an embodiment, the spring effect can be derived from the material properties of the sidewall 4, including the material properties of the folded portions 5. In a particular embodiment, as discussed in greater detail below, the spring effect can be achieved by use of a sidewall material having a high yield and/or elastic strength.

Figure 2B:
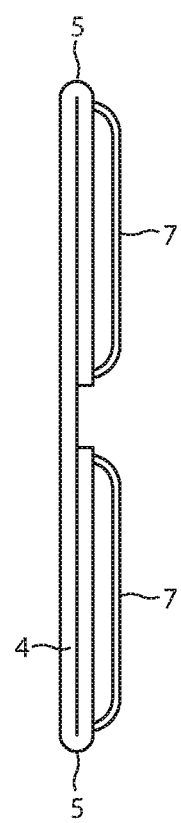
Figure 2C:
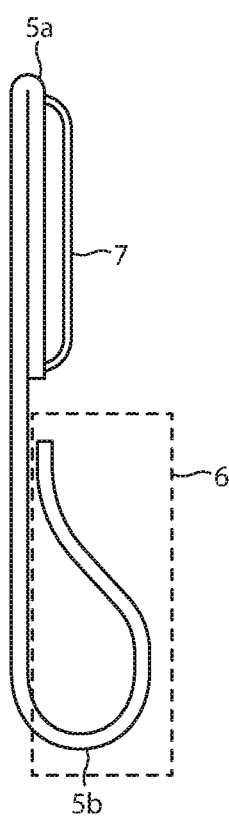
Figure 2D:
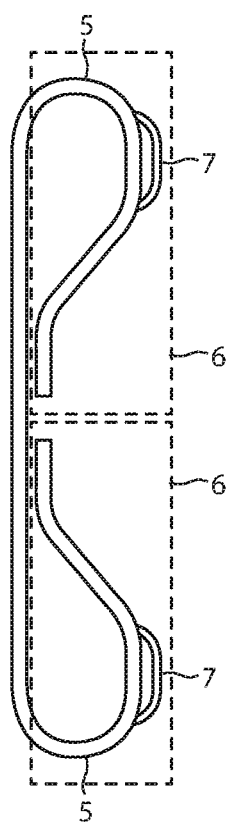

In other embodiments, such as, for example, as illustrated in FIGS. 2B to 2D, at least one of the folded portions 5 of the tolerance ring 2 can include a projection 7. More particularly, the folded portion(s) 5 can further include one or more radially extending projections 7. The projections 7 can be stamped, punched, rolled, or otherwise shaped into the sidewall 4 by a process recognizable in the art to skilled artisans. In these embodiments, tolerance can be absorbed by deformation of the projections 7, e.g., plastic or elastic deformation, alone or in combination with the spring effect of the compression feature 6. In an embodiment, the radially innermost edges of the compression feature 6 and the projection 7 can lie along a same plane. In another embodiment, the innermost radial edges can lie along different planes.

Referring particularly to FIG. 2B, in a certain embodiment, both of the folded portions 5 can exhibit zero, or nominal, spring effect. Rather, projections 7 formed on each of the folded portions 5 can absorb tolerances and radial forces, e.g., via plastic or elastic deformation. In a particular embodiment, a filler (not illustrated) can be incorporated within a void formed between at least one projection 7 and the sidewall 4. That is, the filler can be positioned behind the projection 7. The filler can include a stiffness adjusting characteristic. In such a manner, the projections 7 can be engineered with specific mechanical properties for particular applications. In yet a more particular embodiment, the filler can be sealed within the void of the projection 7.

Referring particularly to FIG. 2C, in another embodiment, one of the folded portions 5a can include a projection 7. Similar to the embodiment illustrated in FIG. 2B, the folded portion 5a can exhibit zero, or nominal, spring effect at locations not occupied by the projection 7. In such a manner, the projection 7 can absorb tolerance and radial forces, e.g., via plastic or elastic deformation. The other folded portion 5b can include a compression feature 6 having a spring effect. In such a manner, two axially or circumferentially adjacent folded portions 5a and 5b can absorb tolerance and other mechanical misalignments via different mechanisms and properties.

Referring particularly to FIG. 2D, in a further embodiment, both of the folded portions 5 can include a compression feature 6 and a projection 7 having tolerance absorption properties. In such a manner, tolerance can be absorbed by both the spring effect of the compression feature 6 and deformation of the projection 7. A tolerance absorption ratio as measured by the relative tolerance compensation of the compression features 6 and the projections 7 can be engineered for particular applications.

Figure 2E:
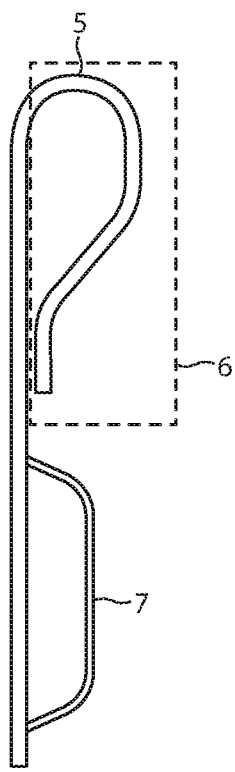

Referring particularly to FIG. 2E, in yet another embodiment, an unfolded portion of the sidewall 4 can include a projection 7 formed therein. The projection 7 can be stamped, punched, rolled, or otherwise shaped by a process as recognizable in the art to skilled artisans. The folded portion 5 can include a compression feature 6 having a spring effect. A skilled artisan will understand that several combinations of the embodiments described in FIGS. 2A to 2E can be generated. Moreover, in an embodiment, circumferentially adjacent folded portions of the tolerance ring 2 can each have different structures and arrangements, e.g., compression features and projections.

In accordance with one or more embodiments, the folded portions 5 can extend in a generally radial direction, e.g., radially inward toward the central axis 8 or radially outward away from the central axis 8. In such a manner, the folded portions 5 can be shaped inwardly, outwardly, or a combination thereof. For example, in a particular embodiment, at least one of the folded portions 5 can extend radially inward and at least one other folded portion 5 can extend radially outward. In another embodiment, at least one of the folded portions 5 can extend both radially inward and radially outward. More particularly, the folded portion 5 can extend radially inward prior to extending radially outward. In an embodiment, the folded portion 5 can form both an inner diameter and an outer diameter of the tolerance ring 2.

Figure 3:
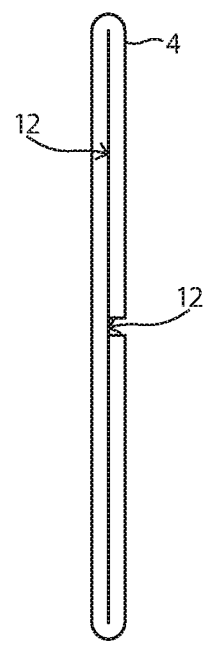
FIG. 3 includes a cross-sectional side elevation view of a tolerance ring in accordance with an embodiment, as seen along Line B-B in FIG. 1.
Figure 9:
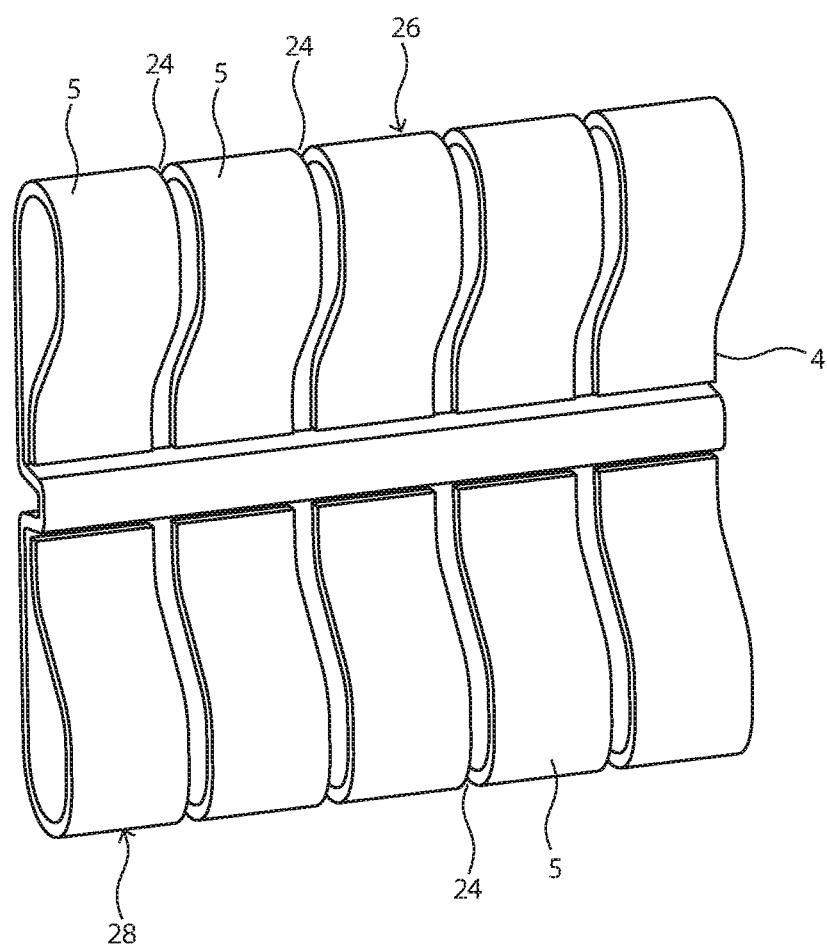
FIG. 9 includes a top perspective view of a tolerance ring preassembly in accordance with an alternate embodiment, prior to shaping the circumferential ends together.

In an embodiment, the folded portions 5 can exhibit zero, or nominal, spring effect at locations between adjacent compression features 6 and projections 7. For example, as illustrated in FIGS. 1 and 3, the portions of the tolerance ring disposed between adjacent compression features 6 can include a flattened, double-wall construction, i.e., a major surface 12 of the folded portion contacts the underlying major surface 12. In an embodiment, e.g., as illustrated in FIG. 9, the portions of the tolerance ring disposed between adjacent compression features 6 can include a single wall construction, i.e., a portion of the major surface 12 disposed between adjacent compression features 6 is exposed, e.g., the major surface 12 is exposed along the portion.

Figure 4:
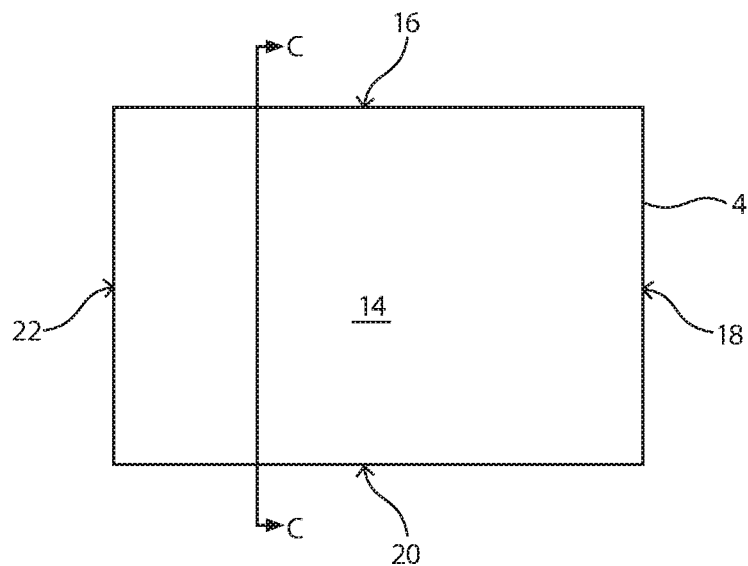
FIG. 4 includes a front elevation view of a strip of material in accordance with an embodiment prior to shaping the tolerance ring.
Figure 5:
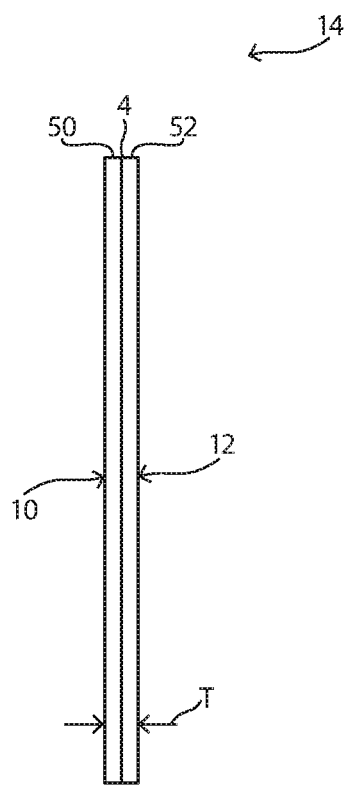
FIGS. 5 and 6 include cross-sectional side elevation views of the strip of material in accordance with embodiments, as seen along Line C-C in FIG. 4, prior to and during shaping of the tolerance ring.

Prior to shaping, the sidewall 4 can initially comprise a strip of material 14. Referring now to FIGS. 4 and 5, the strip 14 can define a (first) major surface 10 and a (second) major surface 12. The major surfaces 10 and 12 can be spaced apart by a thickness, T, of the strip 14. In an embodiment, prior to formation of the tolerance ring 2, the major surfaces 10 and 12 can extend along generally parallel planes (FIG. 5). In a further embodiment, the strip 14 can have a uniform thickness as measured prior to shaping (FIG. 5).

In an embodiment, the strip 14 can define a first edge 16, a second edge 18, a third edge 20, and a fourth edge 22. In a more particular embodiment, the first 16 and third edges 20 can be disposed at opposite sides of the strip 14, and the second 18 and fourth edges 22 can be disposed at opposite sides of the strip 14. In another embodiment, the strip 14 can define more or less than four edges. For example, the strip 14 can define a triangle, a pentagon, a hexagon, a heptagon, an octagon, a nonagon, a decagon, or any other polygon having any number of additional edges.

In an embodiment, the strip 14 can have a polygonal shape. The first, second, third, and fourth edges 16, 18 20, and 22 can be disposed around the strip 14 consecutively positioned in circumferential arrangement. In a more particular embodiment, the strip 14 can have a generally rectangular shape. In this regard, the first and third edges 16 and 20 can be parallel and the second and fourth edges 18 and 22 can be parallel. Moreover, the first and third edges 16 and 20 can be perpendicular to the second and fourth edges 18 and 22.

In a particular embodiment, the strip 14 can include a substrate 50. The substrate 50 can include, or essentially include, a metal or an alloy. More particularly, the substrate 50 can include, or essentially include, a steel. In yet a more particular embodiment, the substrate 50 can include, or essentially include, a medium- or high-carbon steel, such as, for example, a spring steel. In an embodiment, the substrate 50 can have a high yield strength, e.g., a yield strength of at least 200 MPa, such as at least 400 MPa, at least 600 MPa, at least 800 MPa, or even at least 1000 MPa. In a further embodiment, the substrate 50 can have a yield strength of no greater than 10,000 MPa, such as no greater than 5,000 MPa, or even no greater than 2,000 MPa.

In an embodiment, the strip 14 can further include, or essentially include, a polymeric layer 52. In an embodiment, the polymeric layer 52 can include, or essentially include, a low friction material, e.g., a material having a coefficient of static friction of less than 0.5, such as less than 0.4, less than 0.3, less than 0.2, less than 0.1 or even less than 0.05 as measured dry against steel.

In a certain embodiment, the polymeric layer 52 can include, or essentially include, a low friction polymer, such as, a fluoropolymer, such as a polytetrafluoroethylene (PTFE). Other exemplary fluoropolymers can include a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Additionally, it is possible to use a large number of other sliding materials, such as, for example, those marketed by Saint-Gobain under the trademark Norglide®.

In yet a further embodiment, a lubricant can be disposed on, or within, the polymeric layer 52. Exemplary lubricants include molybdenum disulfide, tungsten disulfide, graphite, grapheme, expanded graphite, boron nitrade, talc, calcium fluoride, or any combination thereof. Additionally, the lubricant can include alumina, silica, titanium dioxide, calcium fluoride, boron nitride, mica, Wollastonite, silicon carbide, silicon nitride, zirconia, carbon black, pigments, or any combination thereof.

The polymeric layer 52 can be coupled to at least a portion of the substrate 50, for example, by an adhesive, mechanical anchoring, or as a pressed or otherwise formed laminate. In a particular embodiment, the polymeric layer 52 can extend along only one surface of the substrate 50. In a non-illustrated embodiment, the polymeric layer 52 can fully encapsulate the substrate 50.

Figure 6:
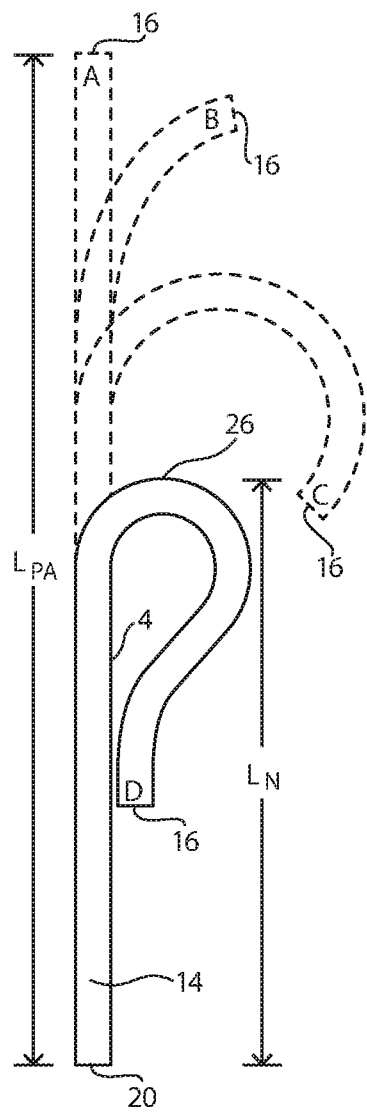

Referring now to FIG. 6, during shaping, the first edge 16 of the strip 14 can be shaped toward the third edge 20. For example, the strip 14 can be folded, bent, or otherwise manipulated such that a distance between the first and third edges 16 and 20 decreases at one or more locations there along to form the folded portion 5. In a particular embodiment, the first edge 16 can be uniformly shaped toward the third edge 20, i.e., the folded portion 5 has a uniform shape and size along a length of the first edge 16. Dashed outlines A, B, and C are intended to show exemplary conformation outlines of shapes through which the strip 14 may pass during the shaping process. A skilled artisan will recognize that the dashed outlines A, B, and C are merely illustrative and are not intended to limit the scope of the disclosure.

As illustrated by outline D, the first edge 16 can be shaped toward the underlying sidewall 4. In an embodiment, the first edge 16 can be in contact with the underlying sidewall 4. In another embodiment, as illustrated, the first edge 16 can be spaced apart from the underlying sidewall 4. A nominal distance between the first edge 16 and the underlying sidewall 4 may be advantageous for initial tolerance absorption as encountered during initial installation between an inner and outer component. The nominal distance may also increase relative axial sliding of the first edge 16 toward the third edge 20 during use.

In an embodiment, a preformed axial length, $L_{P4}$, of the strip 14 can be reduced by at least 5%, such as by at least 10%, at least 15%, at least 20%, at least 25%, at least 30%, at least 35%, at least 40%, or even at least 45% as the first edge 16 is shaped toward the third edge 20 to form a new axial length, $L_N$, of the strip 14. As used herein, "preformed axial length" refers to the axial length of the strip 14 as measured between the first and third edges 16 and 20 prior to shaping (e.g., FIGS. 4 and 5). More particularly, "preformed axial length" can refer to the length between the first and third edges 16 and 20 prior to forming the folded portions 5 or any other features which reduce the distance between the first and third edges 16 and 20. Even more particularly, "preformed axial length" may refer to a relative axial length of the strip 14 as measured at each position along the first and third edges. In strips having non-rectangular shapes the preformed axial length may vary as measured from the second edge 18 to the fourth edge 22. In this regard, the preformed axial length may be a function of the specific location of measurement along the first and third edges 16 and 20. In a further embodiment, the preformed axial length of the strip 14 can be reduced during shaping of the first edge 16 to the third edge 20 by no greater than 50%, such as by no greater than 49%, no greater than 48%, no greater than 47%, or even by no greater than 46%.

In an embodiment, the strip 14 can be folded such that an internal angle, as measured between the sidewall and the folded portions 5 as formed by folding the first edge 16 toward the third edge 20, can be at least 10°, at least 45°, or even at least 90°. In a further embodiment, the internal angle can be at least 100°, at least 135°, or even at least 180°.

An axial apex formed during shaping of the first edge 16 toward the third edge 20 can form a first axial end 26 of the tolerance ring 2.

In a particular embodiment, formation of the projections 7 can occur prior to shaping the first edge 16 toward the third edge 20. In such a manner, the projections 7 can be formed along a planar surface, e.g., by a press or a hammer. A skilled artisan will recognize that projections formed prior to shaping may be formed with a reverse orientation such that after shaping, the projections are oriented in the proper radial direction. In another embodiment, formation of the projections 7 can occur during or after shaping of the first edge 16 toward the third edge 20. In such a manner, the projections 7 can be formed as the sidewall 4 of the tolerance ring 2 approaches or reaches its final position. This may reduce or eliminate generation of stress risers within or adjacent to the projections 7 which may result in cracking during shaping of the first edge 16 toward the third edge 20.

In yet a further, non-illustrated embodiment, projections can be formed along at least two circumferential rows. The rows of projections can extend in the same directions from the strip prior to shaping the strip. In such a manner, shaping of the first edge toward the third edge can form both inwardly and outwardly extending projections. In a more particular embodiment, shaping of the first edge toward the third edge can align the inwardly and outward extending projections, i.e., the projections are disposed at least substantially along the same axial and circumferential positions.

In yet another, non-illustrated embodiment, the projections can be formed along at least two circumferential rows, where the projections of each row extend in opposite directions from the strip prior to shaping the strip. The projections can have slightly offset size such that upon shaping of the first edge toward the third edge, the projections can radially overlap. In such a manner, the engineered strength of the projections can be engineered for specific applications.

Figure 7:
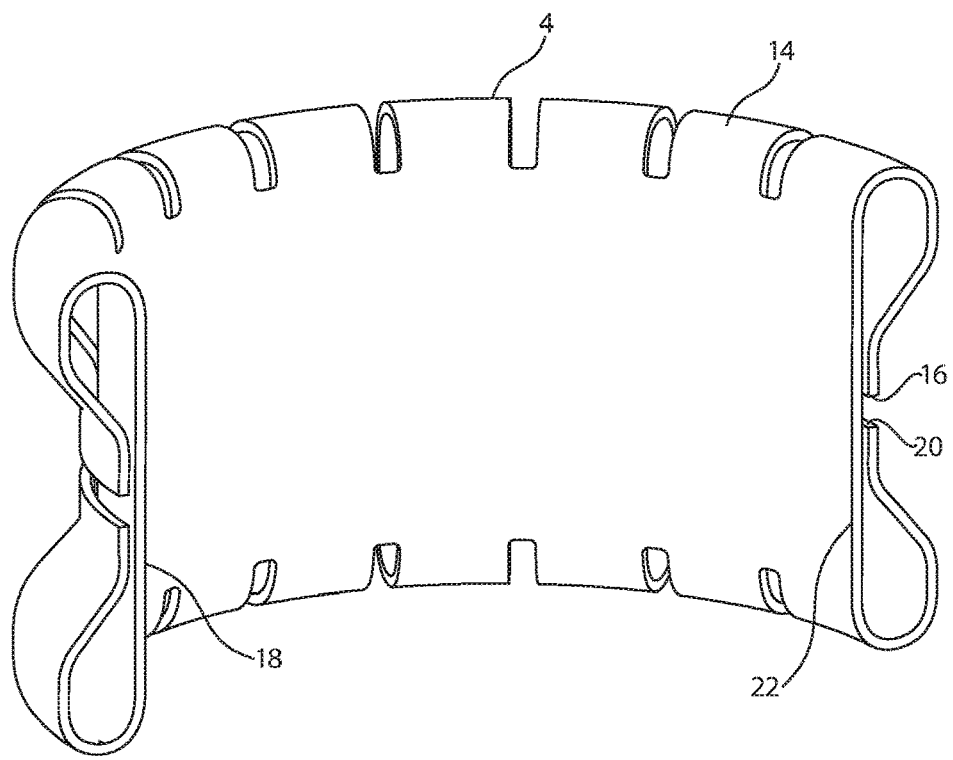
FIG. 7 includes a top perspective view of a tolerance ring in accordance with an embodiment, as the circumferential ends are brought together.

In an embodiment, after shaping the first edge 16 toward the third edge 20, the second edge 18 of the strip 14 can be shaped toward the fourth edge 22 to define an annular sidewall 4 (FIG. 7). For example, the strip 14 can be folded, bent, or otherwise manipulated such that a distance between the second and fourth edges 18 and 22 decreases. In this regard, the second and fourth edges 18 and 22 can define circumferential ends of the tolerance ring 2, forming a circumferential gap extending along the axial length of the tolerance ring 2. The second and fourth edges 18 and 22 can be brought together to further reduce the size of the circumferential gap. In a particular embodiment, the second and fourth edges 18 and 22 can be coupled together. In a further embodiment, the second and fourth edges 18 and 22 can be joined, e.g., by welding, an adhesive, by a threaded or non-threaded fastener, by mechanical deformation such as crimping, or by any other suitable method recognizable in the art for joining circumferential gaps in tolerance rings.

In an embodiment, the tolerance ring 2 can have a multiple wall construction. As used herein, "multiple wall construction" refers to a sidewall including an annular body shaped such that a line extending radially outward from a central axis of the annular body intersects two or more discrete annular sidewalls along at least one axial position of the central axis. In embodiments where the sidewall is formed from a laminate including, for example, a substrate and a low friction material, the laminate is considered as one discrete annular sidewall. The "multiple wall construction" can include three radially adjacent sidewalls, four radially adjacent sidewalls, five radially adjacent sidewalls, or even six radially adjacent sidewalls. In accordance with an embodiment, the "multiple wall construction" can include no greater than 100 radially adjacent sidewalls, such as no greater than 50 radially adjacent sidewalls, or even no greater than 20 radially adjacent sidewalls. "Multiple wall construction" as used herein does not include a sidewall formed from a single piece of material concentrically looped in a circumferential direction to form a multiple layer ring, but rather includes a material shaped in an axial direction. In an embodiment, the tolerance ring 2 can have a multiple wall construction along at least 25% of an axial length of the tolerance ring 2, such as along at least 50% of the axial length, at least 60% of the axial length, along at least 75% of the axial length, at least 80% of the axial length, or even at least 85% of the axial length. In another embodiment, the tolerance ring can have a multiple wall construction along less than 100% of the axial length of the tolerance ring, such as no greater than 99% of the axial length, no greater than 98% of the axial length, no greater than 97% of the axial length, no greater than 96% of the axial length, no greater than 95% of the axial length, or even no greater than 90% of the axial length.

Figure 8:
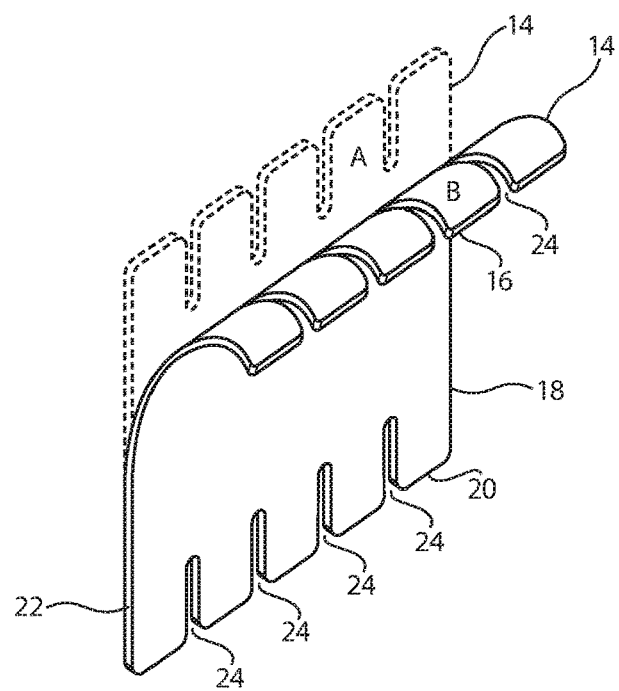
FIG. 8 includes a top perspective view of a strip of material in accordance with an alternate embodiment, during shaping of the tolerance ring.

In a more particular embodiment, illustrated in FIGS. 8 and 9, one or more slots 24 can be formed in the strip 14. Dashed outline A (FIG. 8) is intended to show the strip 14 prior to shaping.

In an embodiment, at least one of the slots 24 can be formed in the strip 14 prior to shaping the first edge 16 toward the third edge 20. The slots 24 can be formed along the first edge 16, the third edge 20, or along a combination thereof. At least one of the slots 24 can extend from the first or third edges 16 or 20 toward the third or first edges 20 or 16, respectively. More particularly, all of the slots 24 can extend from the first or third edges 16 or 20 toward the third or first edges 20 or 16. The slots 24 can facilitate shaping of the first edge 16 toward the third edge 20, or the third edge 20 to the first edge 16 (discussed in greater detail below). More particularly, the slots 24 can alleviate stress risers from forming within the strip 14 during the shaping processes. Additionally, the slots 24 can increase tolerance absorption or even tolerance sensitivity, e.g., by allowing deflection of the compression features 6 at lower radial loading conditions. Yet additionally, the slots 24 can assist in shaping the second edge 18 toward the fourth edge 22 of the strip 14.

In a particular embodiment, all of the slots 24 can be oriented in a generally parallel direction. As used herein, a "generally parallel direction" refers to an angular offset between two or more lines, or central lines in the case of non-straight lines (e.g., arcuate lines), of no greater than 15°, such as no greater than 10°, no greater than 5°, no greater than 2°, or even no greater than 1°. In a more particular embodiment, all of the slots 24 can be oriented in a parallel direction. As used herein, a "parallel direction" refers to an angular offset between two or more lines, or central lines in the case of non-straight lines (e.g., arcuate lines), of no greater than 0.1°.

In yet another embodiment, the slots 24 can be oriented perpendicular, or generally perpendicular (e.g., between 75° and 105°, such as between 85° and 95°), with respect to the first and third edges 16 and 20.

The slots 24 can have a length, $L_S$, as measured by a shortest distance from the first or third edge 16 or 20 to an axial end of the slot, e.g., a maximum distance from the first or third edge 16 or 20 to a furthest point of the slot 24, as measured in a direction perpendicular to the first or third edge 16 or 20. In an embodiment, $L_S$ can be no greater than 50% of the preformed axial length of the strip 14. In a further embodiment, $L_S$ can be no greater than 45% of the preformed axial length, such as no greater than 40% of the preformed axial length, no greater than 35% of the preformed axial length, no greater than 30% of the preformed axial length, no greater than 25% of the preformed axial length, no greater than 20% of the preformed axial length, no greater than 15% of the preformed axial length, no greater than 10% of the preformed axial length, or even no greater than 5% of the preformed axial length. In yet a further embodiment, $L_S$ can be no less than 0.1% of the preformed axial length of the strip 14, such as no less than 0.5%, no less than 1%, no less than 2%, no less than 3%, or even no less than 4%. In an embodiment, each slot 24 can terminate at a stress concentration reducing element, e.g., a round or relief slot (not illustrated). The stress concentration reducing element may reduce the buildup of stress risers within the strip 14 during shaping. This can reduce cracking or fracturing of the strip 14 during formation and use.

In a more particular embodiment, at least one slot 24 can be disposed between adjacent folded portions 5. More particularly, one slot 24 can be disposed between each folded portion 5. The slots 24 may increase independent flexural response of each folded portion 5 to loading conditions, thereby increasing concentricity capabilities of the tolerance ring 2.

In another embodiment, after shaping the first edge 16 of the strip 14 toward to the third edge 20, but prior to shaping the second edge 18 of the strip 14 to the fourth edge 22, the third edge 20 of the strip 14 can be shaped toward the first edge 16. For example, the strip 14 can be folded, bent, or otherwise manipulated such that a distance between the first and third edges 16 and 20 further decreases at one or more locations along the strip of material 14 (FIG. 2). In an embodiment, the strip 14 can have an axial length after folding the first edge 16 toward the third edge 20 that is further reduced by at least 5%, such as by at least 10%, at least 15%, at least 20%, at least 25%, at least 30%, at least 35%, at least 40%, or even at least 45%, upon shaping the third edge 20 toward the first edge 16. The edge formed by this process can form a second axial end 28 of the tolerance ring 2. Moreover, two circumferentially extending rows of folded portions 5 can be formed, each at, or immediately adjacent to, an axial end 26 or 28 of the tolerance ring 2.

As discussed above, one or more slots 24 can be formed in the strip 14 along the third edge 20. In an embodiment, at least one of the slots 24 can be formed in the strip 14 prior to shaping the third edge 20 toward the first edge 16. The slots 24 can be formed along the third edge 20. At least one of the slots 24 can extend from the third edge 20 toward the first edge 16. More particularly, all of the slots 24 can extend from the third edge 20 toward the first edge 16. The slots 24 can facilitate shaping of the third edge 20 to the first edge 16. More particularly, the slots 24 can alleviate stress risers from forming within the strip 14 during the shaping processes. Additionally, the slots 24 can increase tolerance absorption or even tolerance sensitivity, e.g., by allowing deflection of the compression features 6 at lower radial loading conditions.

The slots 24 formed along the third edge 20 can have any number of similar features as the slots 24 formed along the first edge 16. For example, the slots 24 along the third edge 20 may be oriented in a generally parallel, or parallel, direction with one another. In another embodiment, the slots 24 along the third edge 20 can be oriented perpendicular, or generally perpendicular (e.g., between 75° and 105°, such as between 85° and 95°), with respect to the first and third edges 16 and 20. In yet another embodiment, the slots can have a length, $L_S$, as measured by a shortest distance from the third edge 20 to an axial end of the slot 24. In an embodiment, $L_S$ can be no greater than 50% of the preformed axial length of the strip 14. In a further embodiment, $L_S$ can be no greater than 45% of the preformed axial length, such as no greater than 40% of the preformed axial length, no greater than 35% of the preformed axial length, no greater than 30% of the preformed axial length, no greater than 25% of the preformed axial length, no greater than 20% of the preformed axial length, no greater than 15% of the preformed axial length, no greater than 10% of the preformed axial length, or even no greater than 5% of the preformed axial length. In yet a further embodiment, $L_s$ can be no less than 0.1% of the preformed axial length of the strip 14, such as no less than 0.5%, no less than 1%, no less than 2%, no less than 3%, or even no less than 4%. In yet a further embodiment, each slot 24 can terminate at a stress concentration reducing element, e.g., a round or relief slot (not illustrated). The stress concentration reducing element may reduce the buildup of stress risers within the strip 14 during shaping. This can reduce cracking or fracturing of the strip 14 during formation and use.

In accordance with an embodiment, in order to increase stability and resistance of the tolerance ring 2 to deformation, torqueing, and twisting, at least three compression features 6 or projections 7 can be disposed along each opposite axial end 26 and 28 of the tolerance ring 2. The three compression features 6 or projections 7 along each axial end 26 and 28 can form a total of six points of radial contact with one of the inner and outer components (not illustrated).

In an embodiment, the compression features 6 or projections 7 can be equally spaced apart in a circumferential direction.

Figure 10:
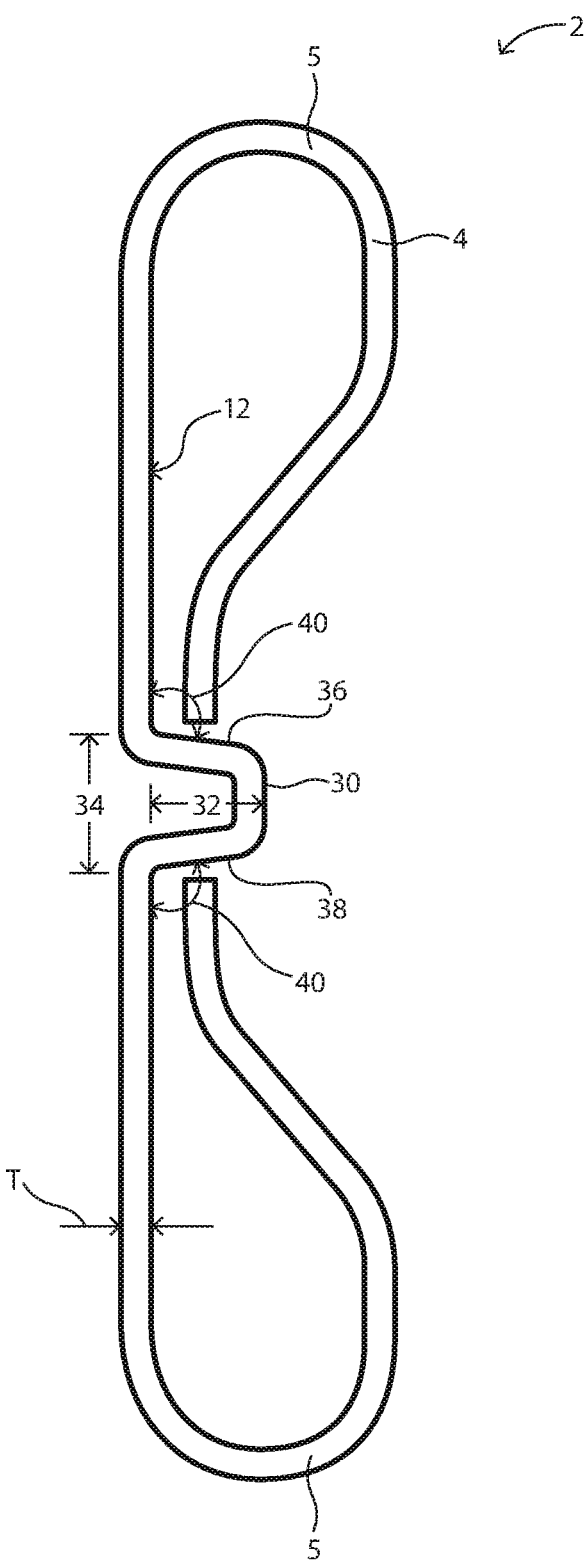
FIG. 10 includes a cross-sectional side elevation view of the tolerance ring in accordance with an embodiment.

Referring now to FIG. 10, in an embodiment, the tolerance ring 2 can further include a rib 30 extending at least partially around the circumference of the sidewall 4. More particularly, the rib 30 can extend circumferentially around the entire sidewall 4. The rib 30 can be disposed at a central location of the tolerance ring 2. More particularly, the rib 30 can be disposed at an axially central location of the tolerance ring 2.

In a particular embodiment, the rib 30 can be unitary, e.g., monolithic, with the sidewall 4 of the tolerance ring 2. The rib 30 can be shaped by bending, folding, or otherwise similarly manipulating the sidewall 4. In an embodiment, the rib 30 can have a projected radial height 32 as measured perpendicular to the major surface 12, that is at least 25% of the thickness, T, of the sidewall 4. In a further embodiment, the projected radial height 32 can be at least 50% T, such as at least 75% T, at least 100% T, at least 125% T, at least 150% T, at least 175% T, or even at least 200% T. In another embodiment, the projected radial height 32 can be no greater than 10,000% T, such as no greater than 5,000% T, no greater than 1,000% T, no greater than 900% T, no greater than 800% T, no greater than 700% T, no greater than 600% T, or even no greater than 500% T.

In an embodiment, the rib 30 can have an axial length 34, as measured along the major surface 12, that is less than 25% of a formed axial length of the tolerance ring 2. As used herein, "formed axial length" is the axial length of the tolerance ring as measured after shaping is finished, e.g., after forming the folded portions 5, the rib 30, and any other features which change the axial length of the tolerance ring. In a further embodiment, the rib 30 can have an axial length 34 that is less than 20% the formed axial length of the tolerance ring, such as less than 15% the formed axial length of the tolerance ring, less than 10% the formed axial length of the tolerance ring, or even less than 5% the formed axial length of the tolerance ring. In another embodiment, the rib 30 can have an axial length 34 that is at least 0.1% the formed axial length of the tolerance ring, such as at least 0.5% the formed axial length of the tolerance ring, at least 1% the formed axial length of the tolerance ring, at least 2% the formed axial length of the tolerance ring, at least 3% the formed axial length of the tolerance ring, or even at least 4% the formed axial length of the tolerance ring.

In an embodiment, the folded portions 5 can freely float, e.g., after shaping they are not secured to major surface 12, but instead can translate along the major surface 12. The rib 30 can form an axial stop, preventing the folded portions 5 from translating beyond a prescribed position along the axial length of the tolerance ring 2.

In an embodiment, the rib 30 can have a generally frustoconical shape, defining two walls 36 and 38. More particularly, the walls 36 and 38 can define a relative base angle 40 that is at least 45°, such as at least 60°, at least 75°, at least 90°, at least 105°, or even at least 120°. In yet a more particular embodiment, the relative base angle 40 can be no greater than 179°, such as no greater than 175°, no greater than 160°, no greater than 145°, or even no greater than 130°. For relative base angles 40 of less than 90° the walls 36 and 38 of the rib 30 can form an immediate stop, preventing the compression features 6 from further translating. For relative base angles 40 of greater than 90°, the walls 36 and 38 of the rib 30 can form a wedge, increasing the force necessary for continued translation of the compression feature 6.

In another embodiment, the rib 30 can increase a stiffness of the tolerance ring by at least 1% as compared to a similar tolerance ring devoid of a rib 30. As used herein, "stiffness of the tolerance ring" refers to a relative ability of the tolerance ring to avoid deformation as caused, for example, by torsional or rotational forces. For example, if an identical force is applied to two tolerance rings at the same relative locations, and the first tolerance ring deflects 5 mm while the second tolerance ring deflects 10 mm, the first tolerance ring has a stiffness of 200% the stiffness of the second tolerance ring. In a further embodiment, the rib 30 can increase the stiffness of the tolerance ring 2 by at least 2% as compared to a similar tolerance ring devoid of a rib 30, such as by at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, at least 50%, at least 75%, at least 100%, at least 150%, at least 200%, or even at least 500%. In another embodiment, the rib 30 can increase the stiffness of the tolerance ring 2 by no greater than 1000%, such as no greater than 750%.

Referring now to FIG. 11, an assembly 100 can comprise a tolerance ring 2 disposed within an annular gap 106 formed between in inner component, e.g., a shaft, 102 and an outer component, e.g., a bore, 104. A skilled artisan will recognize that the folded portions 5 can be oriented radially outward (as illustrated) or radially inward depending on the application.

In an embodiment, at least a portion of the folded portions 5 can translate generally along lines 42 and 44 toward the rib 30 as a radial loading force is applied to the outermost portions of the tolerance ring 2. Additionally, the folded portions 5 can further compress in a radial direction, as illustrated by lines 46 and 48. In this regard, the folded portions 5 can absorb radial loading forces between the inner and outer components 102 and 104.

In a particular embodiment, the assembly 100 can comprise a portion of a hard disk drive (HDD). For example, the inner component 102 can be a pivot, the outer component 104 can be an actuator arm, and the tolerance ring 2 can provide torque transmission therebetween. However, the assembly 100 is not intended to be limited to HDD assemblies. For example, the assembly 100 can be used in the automotive and aerospace industries, the energy sector, as well as in various machinery and industries that require the use of a torque transmitter. Further exemplary applications include steering columns, stators, compressors, stanchions, axles, and other similar reciprocating and rotating assemblies.

In an embodiment, the folded portions 5 can be disposed at, or immediately adjacent to, opposite axial ends of the tolerance ring 2. Traditional tolerance rings typically have either: (1) projections spaced apart from the axial ends of the ring to increase uniformity across the axial length of the projections, or (2) corrugations extending along the entire axial length of the tolerance ring. Such features reduce stabilizing capacity of the tolerance rings against torsional forces, circumferential forces, axial forces, and combinations thereof. Utilization of folded portions 5 along, or at, axial ends of the tolerance ring 2 can increase stabilizing capacity and reduce wobble by spacing the circumferentially extending rows of projections apart from one another to a maximum extent permitted by the axial length of the tolerance ring.

Many different aspects and embodiments are possible. Some of those aspects and embodiments are described below. After reading this specification, skilled artisans will appreciate that those aspects and embodiments are illustrative and do not limit the scope of the present invention. Embodiments may be in accordance with any one or more of the items as listed below.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A tolerance ring comprising:
  a sidewall having a first and a second opposite major surfaces spaced apart by a thickness, wherein the first major surface defines an inner diameter of the tolerance ring at a first location of the sidewall and an outer diameter of the tolerance ring at a second location of the sidewall.

Embodiment 2. The tolerance ring according to the preceding embodiment, wherein the tolerance ring comprises a multiple wall construction along at least 25% of an axial length of the tolerance ring, such as along at least 50% of the axial length, at least 60% of the axial length, along at least 75% of the axial length, at least 80% of the axial length, or even at least 85% of the axial length.

Embodiment 3. The tolerance ring according to any one of the preceding embodiments, wherein the first major surface defines a radially outermost surface of the tolerance ring at a first location of the sidewall and a radially innermost surface of the tolerance ring at a second location of the sidewall.

Embodiment 4. A tolerance ring having a multiple wall construction along at least 25% of an axial length of the tolerance ring, such as along at least 50% of the axial length, at least 60% of the axial length, along at least 75% of the axial length, at least 80% of the axial length, or even at least 85% of the axial length.

Embodiment 5. The tolerance ring according to any one of the preceding embodiments, wherein the multiple wall construction extends along less than 100% of the axial length of the tolerance ring, such as no greater than 99% of the axial length, no greater than 98% of the axial length, no greater than 97% of the axial length, no greater than 96% of the axial length, no greater than 95% of the axial length, or even no greater than 90% of the axial length.

Embodiment 6. The tolerance ring according to any one of embodiments 4 and 5, wherein the multiple wall construction comprises 2 sidewalls.

Embodiment 7. The tolerance ring according to any one of embodiments 4-6, wherein the multiple wall construction comprises at least 3 sidewalls, such as at least 4 sidewalls, or even at least 5 sidewalls.

Embodiment 8. The tolerance ring according to any one of embodiments 4-7, wherein the multiple wall construction comprises no greater than 100 sidewalls, such as no greater than 50 sidewalls, or even no greater than 20 sidewalls.

Embodiment 9. The tolerance ring according to any one of the preceding embodiments, wherein the sidewall comprises a metal.

Embodiment 10. The tolerance ring according to any one of the preceding embodiments, wherein the sidewall comprises a steel, such as spring steel.

Embodiment 11. The tolerance ring according to any one of the preceding embodiments, wherein the tolerance ring further comprises a polymeric layer, and wherein the polymeric layer is coupled to at least a portion of the sidewall.

Embodiment 12. The tolerance ring according to embodiment 11, wherein the polymeric layer comprises a low friction material.

Embodiment 13. The tolerance ring according to any one of embodiments 11 and 12, wherein the polymeric material comprises a PTFE.

Embodiment 14. The tolerance ring according to any one of the preceding embodiments, wherein the tolerance ring comprises a plurality of folded portions.

Embodiment 15. The tolerance ring according to embodiment 14, wherein the folded portions comprise compression features Embodiment 16. The tolerance ring according to embodiment 15, wherein the compression features are adapted to absorb a tolerance between an inner component and an outer component.

Embodiment 17. The tolerance ring according to any one of embodiments 15 and 16, wherein the compression features are disposed adjacent to an axial end of the tolerance ring.

Embodiment 18. The tolerance ring according to any one of embodiments 15-17, wherein the tolerance ring has a first and second opposite axial ends, and wherein at least three compression features are disposed at the first axial end and at least three compression features are disposed at the second axial end.

Embodiment 19. The tolerance ring according to any one of embodiments 15-18, wherein the compression features are equally spaced apart in a circumferential direction around the tolerance ring.

Embodiment 20. The tolerance ring according to any one of embodiments 15-19, wherein the compression features are folded.

Embodiment 21. The tolerance ring according to any one of embodiments 14-20, wherein the folded portions comprise radially extending projections.

Embodiment 22. The tolerance ring according to any one of embodiments 14-20, wherein the folded portions are continuous with a sidewall of the tolerance ring.

Embodiment 23. The tolerance ring according to any one of embodiments 14-21, wherein the folded portions are unitary with a sidewall of the tolerance ring.

Embodiment 24. The tolerance ring according to any one of embodiments 15-22, wherein the tolerance ring has a sidewall defining a thickness, and wherein the compression features have a projected radial height greater than the thickness of the sidewall.

Embodiment 25. The tolerance ring according to embodiment 24, wherein the projected radial height of the compression features is at least 110% the thickness of the sidewall, such as at least 115%, at least 120%, at least 125%, at least 130%, at least 135%, at least 140%, at least 145%, at least 150%, at least 175%, at least 200%, at least 225%, at least 250%, at least 275%, at least 300%, or even at least 500%.

Embodiment 26. The tolerance ring according to any one of embodiments 24 and 25, wherein the projected radial height of the compression features is no greater than 1,000% the thickness of the sidewall, such as no greater than 900%, no greater than 800%, or even no greater than 700%.

Embodiment 27. The tolerance ring according to any one of embodiments 15-26, wherein the compression features are deformable in an axial direction.

Embodiment 28. The tolerance ring according to any one of embodiments 15-27, wherein at least a portion of at least one of the compression features is adapted to translate in an axial direction upon receipt of a radial loading condition.

Embodiment 29. The tolerance ring according to any one of embodiments 15-28, wherein all of the compression features are adapted to translate in an axial direction upon receipt of a radial loading condition.

Embodiment 30. The tolerance ring according to any one of embodiments 28 and 29, wherein translation of the compression feature occurs in a direction toward an opposite axial end of the tolerance ring from which the compression feature extends.

Embodiment 31. The tolerance ring according to any one of the preceding embodiments, wherein the tolerance further comprises a rib extending circumferentially around the tolerance ring.

Embodiment 32. The tolerance ring according to embodiment 31, wherein the rib is unitary with a sidewall of the tolerance ring.

Embodiment 33. The tolerance ring according to any one of embodiments 31 and 32, wherein the rib extends around the tolerance ring at an axially central location.

Embodiment 34. The tolerance ring according to any one of embodiments 31-33, wherein the rib has a projected radial height that is at least 25% the thickness of a sidewall of the tolerance ring, such as at least 50%, at least 75%, or even at least 100%.

Embodiment 35. The tolerance ring according to any one of embodiments 31-34, wherein the rib has a projected radial height that is no greater than 1000% the thickness of the sidewall, such as no greater than 900%, no greater than 800%, or even no greater than 700%.

Embodiment 36. The tolerance ring according to any one of embodiments 31-35, wherein the rib has an axial length that is less than 25% of a formed axial length of the tolerance ring, such as less than 20%, less than 15%, less than 10%, or even less than 5%.

Embodiment 37. The tolerance ring according to any one of embodiments 31-36, wherein the rib has an axial length that is at least 0.1% of a formed axial length of the tolerance ring, such as at least 0.5%, at least 1%, at least 2%, at least 3%, or even at least 4%.

Embodiment 38. The tolerance ring according to any one of embodiments 31-37, wherein the rib forms an axial stop, the axial stop preventing a compression feature from translating beyond the rib.

Embodiment 39. The tolerance ring according to any one of embodiments 31-38, wherein the rib increases a stiffness of the tolerance ring at least 1% as compared to a similar tolerance ring devoid of a rib, such as an increase of at least 2%, an increase of at least 3%, an increase of at least 4%, or even an increase of at least 5%.

Embodiment 40. The tolerance ring according to any one of the preceding embodiments, wherein the tolerance ring comprises a preformed axial length, $L_{P4}$, wherein the tolerance ring comprises a formed axial length, $L_N$, and wherein $L_N$ is less than 95% $L_P$, such as less than 90% $L_P$, less than 85% $L_P$, less than 80% $L_P$, less than 75% $L_P$, less than 70% $L_P$, less than 65% $L_P$, less than 60% $L_P$, or even less than 55% L.

Embodiment 41. The tolerance ring according to embodiment 40, wherein $L_N$ is at least 5% $L_p$, such as at least 10% $L_P$, at least 15% $L_P$, at least 20% $L_P$, at least 25% $L_P$, at least 30% $L_P$, at least 35% $L_p$, at least 40% $L_P$, or even at least 45% L.

Embodiment 42. The tolerance ring according to any one of the preceding embodiments, wherein the tolerance ring comprises a formed axial length, and wherein the entire formed axial length is adapted to be disposed within a bore.

Embodiment 43. An assembly comprising:
an outer component defining a bore;
an inner component disposed in the bore; and
a tolerance ring in accordance with any one of the preceding embodiments, the tolerance ring disposed between the inner and outer components.

Embodiment 44. A method of forming a tolerance ring comprising:
providing a strip of material comprising a first, a second, a third, and a fourth edge;
shaping the first edge of the strip toward the third edge;
shaping the second edge of the strip toward the fourth edge.

Embodiment 45. The method according to embodiment 44, wherein shaping the first edge toward the third edge forms a compression feature.

Embodiment 46. The method according to any one of embodiments 44 and 45, further comprising:
forming slots within the strip of material along the first and third edges.

Embodiment 47. The method according to embodiment 46, wherein the step of forming slots is performed before shaping the first edge toward the third edge.

Embodiment 48. The method according to any one of embodiments 46 and 47, wherein the slots extend from the first and third edges toward the third and first edges, respectively.

Embodiment 49. The method according to any one of embodiments 46-48, wherein the slots are oriented in a parallel direction.

Embodiment 50. The method according to any one of embodiments 46-49, wherein the slots are oriented perpendicular to the first and third edges.

Embodiment 51. The method according to any one of embodiments 46-50, wherein the slots have a length, and wherein the length of the slots is no greater than 50% of a preformed axial length of the strip of material, such as no greater than 45%, no greater than 40%, no greater than 35%, no greater than 30%, no greater than 25%, no greater than 20%, no greater than 15%, no greater than 10%, or even no greater than 5%.

Embodiment 52. The method according to any one of embodiments 46-51, wherein at least one slot is formed between adjacent compression features.

Embodiment 53. The method according to any one of embodiments 44-52, wherein the step of shaping the first edge toward the third edge forms a first axial end of the tolerance ring.

Embodiment 54. The method according to any one of embodiments 44-53, wherein the step of shaping the first edge toward the third edge is performed by folding.

Embodiment 55. The method according to any one of embodiments 44-54, wherein the strip of material has a preformed axial length, and wherein the step of shaping the first edge toward the third edge is performed such that the preformed axial length of the strip of material is reduced by at least 5%, such as at least 10%, at least 15%, at least 20%, at least 25%, at least 30%, at least 35%, at least 40%, or even at least 45%.

Embodiment 56. The method according to any one of embodiments 44-55, further comprising:
shaping the third edge of the strip toward the first edge of the strip.

Embodiment 57. The method according to embodiment 56, wherein the step of shaping the third edge toward the first edge forms a second axial end of the tolerance ring.

Embodiment 58. The method according to any one of embodiments 56 and 76, wherein the step of shaping the third edge toward the first edge is performed by folding.

Embodiment 59. The method according to any one of embodiments 55-57, wherein the strip of material has an axial length after folding the first edge toward the third edge, and wherein the step of shaping the third edge toward the first edge is performed such the preformed axial length is further reduced by at least 5%, such as at least 10%, at least 15%, at least 20%, at least 25%, at least 30%, at least 35%, at least 40%, or even at least 45%.

Embodiment 60. The method according to any one of embodiments 44-59, wherein the step of shaping the second edge toward the fourth edge forms a circumferential end of the tolerance ring.

Embodiment 61. The method according to any one of embodiments 44-60, wherein the step of shaping the second edge toward the fourth edge is performed by folding.

Embodiment 62. The method according to any one of embodiments 44-61, wherein the step of shaping the first edge of the strip toward the third edge is performed before shaping the second edge of the strip toward the fourth edge.

Embodiment 63. The method according to any one of embodiments 44-62, further comprising:
coupling the second and fourth edges of the strip together.

Embodiment 64. The method according to any one of embodiments 44-63, further comprising:
welding the second edge of the strip to the fourth edge.

Embodiment 65. The method according to any one of embodiments 44-64, wherein the strip of material comprises a substrate, such as a metal, such as a spring steel.

Embodiment 66. The method according to any one of embodiments 44-65, wherein the strip of material further comprises a polymeric layer, such as a fluoropolymer, such as PTFE.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A tolerance ring comprising:
a sidewall having a first and a second opposite major surfaces spaced apart by a thickness, wherein the first major surface defines an inner diameter of the tolerance ring at a first location of the sidewall and an outer diameter of the tolerance ring at a second location of the sidewall, wherein the tolerance ring comprises at least one folded portion at least partially formed by folding an axial end of the sidewall toward an opposite axial end of the sidewall, and wherein at least one of the at least one folded portions comprises a radially extending projection, wherein the tolerance ring further comprises a low friction material coupled to at least a portion of the sidewall.

2. The tolerance ring according to claim 1, wherein the tolerance ring comprises a multiple wall construction along at least 25% of an axial length of the tolerance ring.

3. The tolerance ring according to claim 1, wherein a tangent to the first major surface at the second location is parallel to a central axis of the tolerance ring.

4. The tolerance ring according to claim 1, wherein at least one of the at least one folded portions comprises a compression feature adapted to deform in an axial direction.

5. The tolerance ring according to claim 4, wherein the compression feature is disposed adjacent to an axial end of the tolerance ring.

6. The tolerance ring according to claim 1, wherein the tolerance ring further comprises a rib extending circumferentially around the tolerance ring at an axially central location.

7. The tolerance ring according to claim 1, wherein the folded portion comprises a compression feature disposed adjacent to an axial end of the tolerance ring.

8. The tolerance ring according to claim 7, wherein the compression feature is deformable in an axial direction.

9. The tolerance ring according to claim 1, wherein the tolerance ring further comprises a rib extending circumferentially around the tolerance ring.

10. An assembly comprising:
an outer component defining a bore;
an inner component disposed in the bore; and
a tolerance ring disposed between the inner and outer components, the tolerance ring comprising:
a sidewall having a first and a second opposite major surfaces spaced apart by a thickness, wherein the first major surface defines an inner diameter of the tolerance ring at a first location of the sidewall and an outer diameter of the tolerance ring at a second location of the sidewall, wherein the tolerance ring comprises at least one folded portion at least partially formed by folding an axial end of the sidewall toward an opposite axial end of the sidewall, and wherein at least one of the at least one folded portions comprises a radially extending projection, wherein the tolerance ring further comprises a low friction material coupled to at least a portion of the sidewall.

11. A method of forming a tolerance ring comprising:
providing a strip of material comprising a first, a second, a third, and a fourth edge;
shaping the first edge of the strip toward the third edge; and
shaping the second edge of the strip toward the fourth edge to form a tolerance ring,
wherein the strip of material comprises a substrate and a low friction layer, wherein the tolerance ring formed comprises a folded portion comprising a radially extending projection.

12. The method according to claim 11, wherein shaping the first edge toward the third edge forms a compression feature.

13. The method according to claim 11, further comprising:
forming slots within the strip of material along at least one of the first and third edges before shaping the first edge toward the third edge.

14. The method according to claim 11, wherein the strip of material has a preformed axial length, and wherein the step of shaping the first edge toward the third edge is performed such that the preformed axial length of the strip of material is reduced by at least 25%.

15. The method according to claim 11, further comprising:
shaping the third edge of the strip toward the first edge of the strip.

* * * * *